United States Patent [19]

Bush

[11] Patent Number: 4,666,068

[45] Date of Patent: May 19, 1987

[54] TWO PIECE DISPENSING CLOSURE

[75] Inventor: Randall G. Bush, Evansville, Ind.

[73] Assignee: Sunbeam Plastics Corporation, Evansville, Ind.

[21] Appl. No.: 825,464

[22] Filed: Feb. 3, 1986

Related U.S. Application Data

[63] Continuation-in-part of Ser. No. 664,553, Oct. 25, 1984, abandoned.

[51] Int. Cl.[4] .............................................. B65D 47/08
[52] U.S. Cl. .................................... 222/546; 222/556; 220/338; 16/224; 16/227; 16/DIG. 13
[58] Field of Search .............. 222/498, 517, 546, 556, 222/545; 215/235, 237; 220/337, 338, 340; 16/224, 227, DIG. 13, 257, 259

[56] References Cited

U.S. PATENT DOCUMENTS

| 2,624,907 | 1/1953 | Graham | 220/338 |
|---|---|---|---|
| 2,833,447 | 5/1958 | Thiele | 222/556 X |
| 2,889,087 | 6/1959 | Paull et al. | 222/556 X |
| 3,045,860 | 7/1962 | Harvey | 222/546 X |
| 3,077,282 | 2/1963 | Eggers | 220/338 |
| 3,394,835 | 7/1968 | Peterson | 220/337 |
| 3,497,908 | 3/1970 | Zamarra | 220/338 X |
| 4,109,821 | 8/1978 | Lutz | 220/338 X |
| 4,172,540 | 10/1979 | Erichson | 222/517 |
| 4,220,253 | 9/1980 | Thomas et al. | 220/338 |

FOREIGN PATENT DOCUMENTS

| 1014961 | 8/1952 | France | 220/337 |
|---|---|---|---|
| 644554 | 10/1950 | United Kingdom | 220/338 |

*Primary Examiner*—Charles A. Marmor
*Attorney, Agent, or Firm*—Irvin L. Groh

[57] ABSTRACT

A two piece dispensing closure for a container in which one piece is a cap having means for attachment to the container such as internal threads which engage external threads on the container and a flat top having a dispensing orifice. The second piece of the closure is a lid connected to the cap by a detachable hinge. The hinge is constructed with a pair of posts projecting adjacent the perimeter of the cap or lid into slots in the other of the cap and lid to permit movement between a closed position in which the dispensing lid is covered to an open dispensing position. The hinge is hidden in the closed position providing a pleasing symmetrical appearance.

18 Claims, 8 Drawing Figures

U.S. Patent  May 19, 1987  Sheet 2 of 2  4,666,068
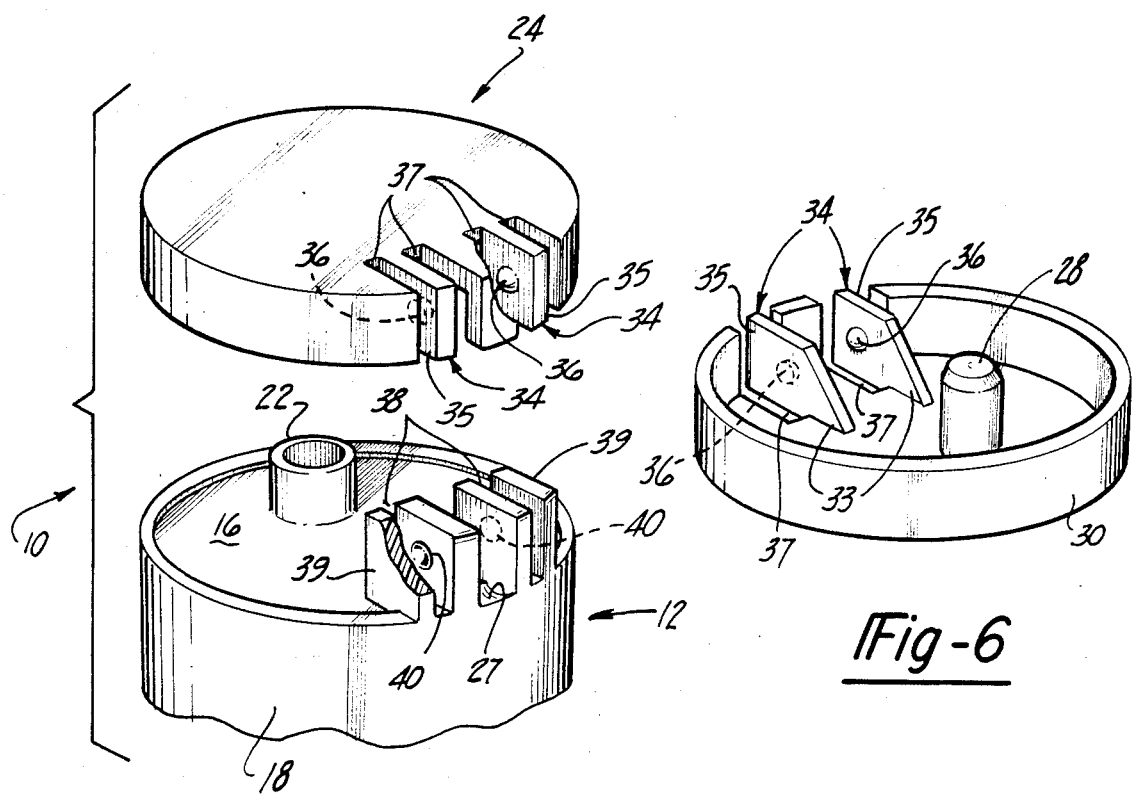
Fig-5
Fig-6
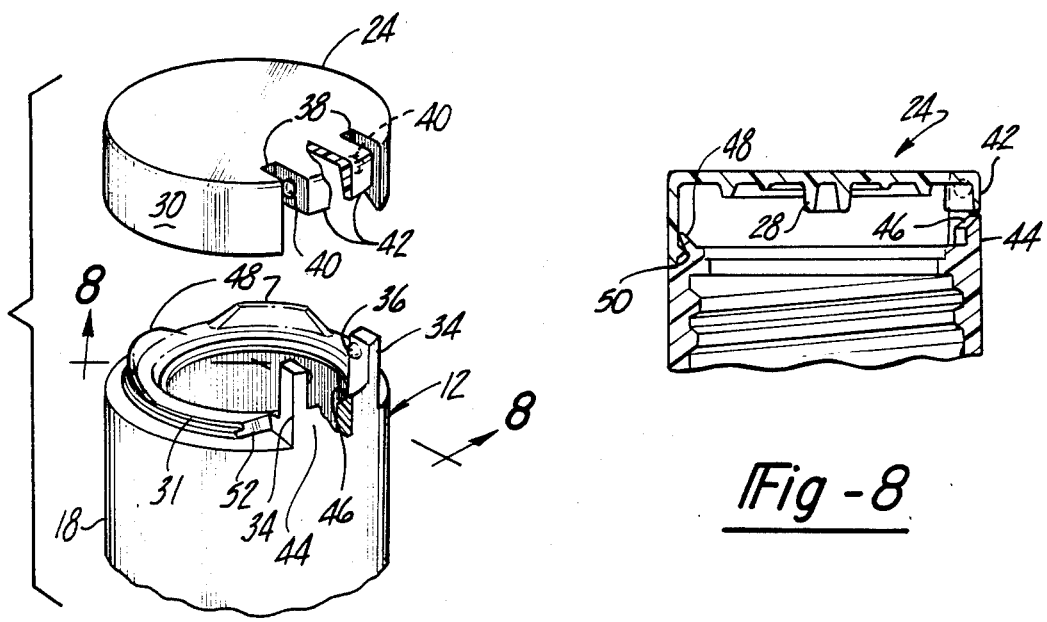
Fig-7
Fig-8

TWO PIECE DISPENSING CLOSURE

This application is a continuation-in-part of application Ser. No. 664,553, filed Oct. 25, 1984 now abondoned.

This invention relates to a dispensing closure for containers and more particularly to a two piece dispensing closure. There are a wide variety of dispensing closures which are provided with a dispensing orifice in the cap and a hinge lid to close the orifice. A number of these closures are designed to have the cap more or less permanently attached to the container so that the container contents must be removed through the dispensing orifice, and a number are made with the cap, lid and hinge being molded as a unit to form a one piece closure. Examples of this type of closure are shown in Montgomery and McAlinden, U.S. Pat. No. 4,371,095 and in Luker, U.S. Pat. No. 4,378,073. Where it is desired to reuse the container and closure, as for example, in food or condiment use such as catsup, mustard, honey or the like, the cap should be easily removed from the container for refilling, and the lid and cap should be easily cleaned.

A two piece closure offers an advantage from the cleaning standpoint and will provide continuing reuse without breakage which can occur from a continuing use of a live hinge structure where the hinge depends upon continuous flexing with a tendency to wear and crack. Most two piece structures are made with a horizontal pin or trunion formed on one part and an engaging opening on the other part. This leads to an exposed hinge structure which projects to one side of the closure destroying symmetry of the closure.

It is therefore an object of this invention to provide a two piece closure which can be easily taken apart for cleaning and reassembled for further use.

It is another object of this invention to provide a two piece closure which inherently has the advantage that the cap and lid may be made of different colors improving the esthetics of the product package.

It is a further object of this invention to provide a hinge which is not breakable.

It is still another object of the instant invention to provide a two piece closure in which the hinge is concealed in the closed position of the closure to provide a full profile-symmetrical appearance.

The objects of the invention are accomplished by providing a two piece closure in which the first piece is a cap which is attached to the container by threads molded into the inner surface of a skirt portion of the cap which cooperates with complementary threads on the neck of the container. This provides for easy removal of the cap for refilling the container, while maintaining the cap firmly affixed to the closure during its normal dispensing use. The cap has an orifice or nozzle which is formed integral with its top surface through which the contents of a container can be removed. The second piece of the closure is a lid which acts to close the dispensing opening on the cap. A plug member is integrally formed on the lid and positioned to engage the dispensing opening on the cap to provide a self-cleaning, sealing and locking engagement with the lid. A hinge is formed by molding the cooperating parts thereof in the cap and lid members, and the hinge is designed in a manner to permit the closure to be taken apart for easy cleaning and to be easily reassembled while providing no projecting parts to distract from the symmetry of the closure. The cap has a pair of upwardly extending posts adjacent to its perimeter and each post has a spherical projection which faces the spherical projection on the other post. The lid is provided with a pair of complementary slots opening at the top, the bottom and the periphery of the lid which slots are further formed with spherically concave indentations facing each other. The slots are aligned to receive the pair of posts and projections thus forming a hinge which allows the lid to move between an open and closed position by the pivotable movement of the spherical projections in the spherically concave indentations. The positions of the slots and posts may be interchanged so that the posts are formed integral with the lid and the slots are formed within the cap to perform an identical function. While in the preferred embodiment, the projections on the posts face each other, it will be apparent that these projections can be located on the posts facing outwardly from each other, or in fact the projections can be formed on both sides of the posts to mate with complementary concave indentations. The hinge thus constructed provides pivotable movement of the spherical projections in the spherical concave indentations allowing the lid to move between an open and closed position with the overall friction of the mating posts and slots retaining the lid in any intermediate position.

The presently preferred embodiment of the invention are illustrated in the accompanying drawing in which:

FIG. 5 is an exploded perspective view of an alternative form of the two piece closure of the present invention with the hinge posts projecting from the cap, showing the lid separated from the cap;

FIG. 6 is a perspective view showing the underside of the lid of FIG. 5;

Figure 1:
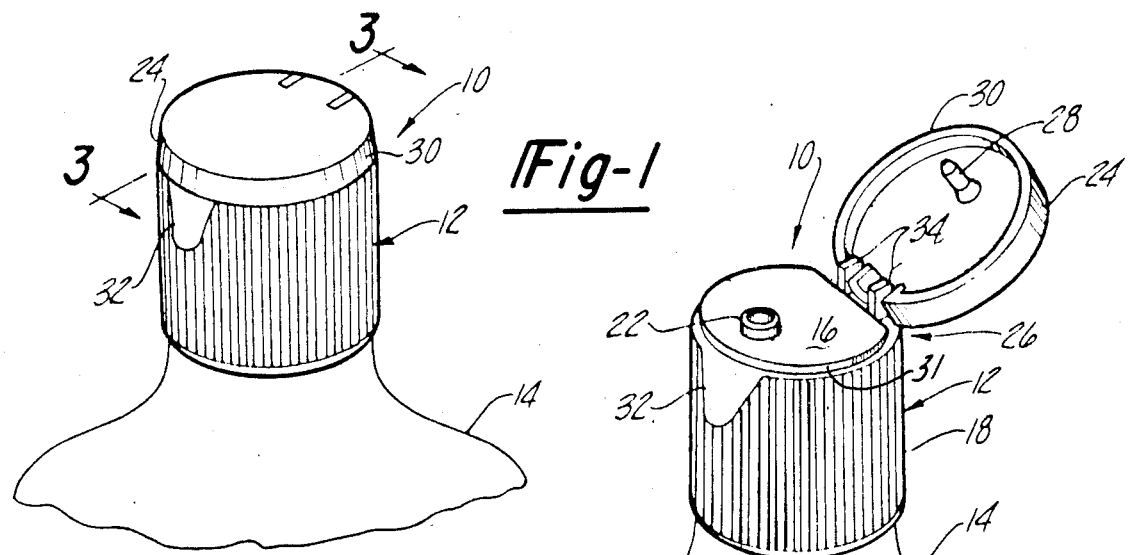
FIG. 1 is a perspective view of the two piece dispensing closure of the present invention with hinge posts projecting from the cap, shown in its closed position and in association with a container, only the upper end of which is shown.

FIG. 7 is an exploded perspective view of another alternative form of the two piece closure of the present invention with the hinge posts projecting from the cap as shown in the embodiments of FIGS. 1-4, but showing a different way of providing hinge swinging clearance and a different way of securing the lid to the cap in the closed position, and FIG. 8 is a cross-sectional view taken on line 8—8 in FIG. 7 and showing the lid engaged with the cap in a closed position.

A two piece dispensing closure embodying the invention is shown generally at 10 having a cylindrical cap 12 which is adapted for use with containers 14. Cap 12 has a generally flat top 16 and a depending annular skirt 18. The skirt 18 is provided with internal threads 20 which mate with complementary threads (not shown) on the exterior of the neck of container 14. Cap 12 has a pouring orifice or nozzle 22 formed on top 16 through which the contents of the container are normally dispensed.

The second piece of two piece dispensing closure 10 is lid 24 which is connected to cap 14 by hinge means 26. Thus, the lid 24 may be swung from an open dispensing position to a closed position covering the pouring nozzle 22. Formed with lid 24 is closure plug 28 which engages with nozzle 22 when the lid is swung into its closed position in a manner to seal the nozzle 22 and to lock the lid 24 to cap 12 by the frictional engagement of plug 28 with nozzle 22. Also with the penetration of plug 28 into nozzle 22 each time lid 24 is closed, a self-cleaning feature is present. Lid 24 has a depending annular skirt 30 which merges with the perimeter of cap 12 when the lid is in its closed position. The cap 12 is provided with an indentation 32 at its edge, opposite to hinge 26. Indentation 32 is beveled toward the top of the cap and is most suitably located on a diametric line with the pouring orifice 22 and the hinge 26. This indentation 32 allows the user to grip the lid 24 to swing it into its open position. In some cases, the cap may be styled to present a rectangular indentation 32 of uniform depth.

Figure 2:
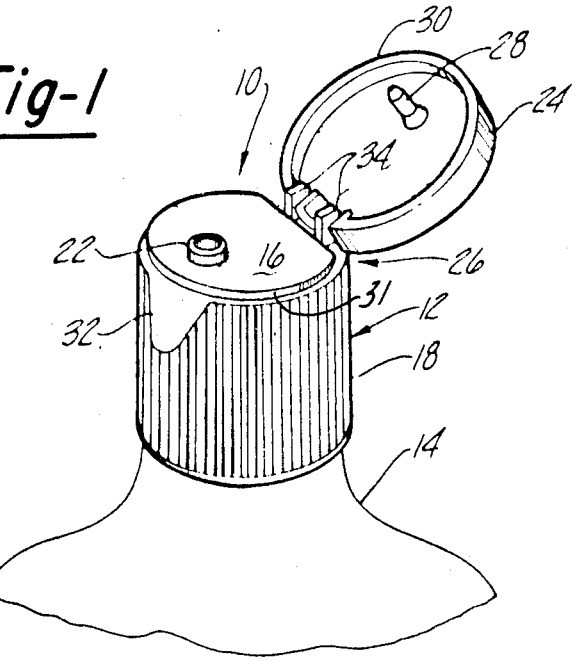
FIG. 2 is a perspective view of the two piece closure of FIG. 1 in its open position relative to a container, only a portion of which is shown.
Figure 3:
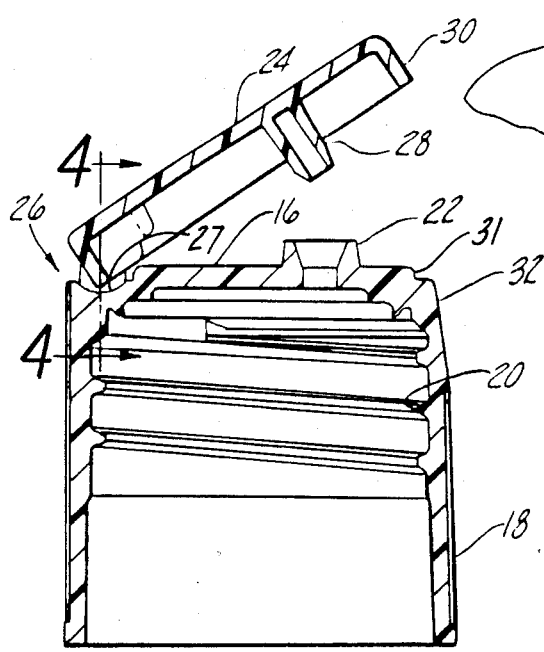
FIG. 3 is a cross-sectional view taken on line 3—3 in FIG. 1.

As seen in FIGS. 2 and 3, the dispensing orifice 22 is shown in the form of a nozzle, raised above cap top 16 to provide a greater contact length with plug 28 and to provide a clear break in the dispensing flow as well as to allow the user to wipe off the nozzle with relative ease. Cap 12 also has a rim 31 recessed below the top surface 16 which accommodates the depending annular skirt 30 of lid 24 and acts to retain the lid 24 on cap 12 whether or not plug 28 is provided.

Figure 4:
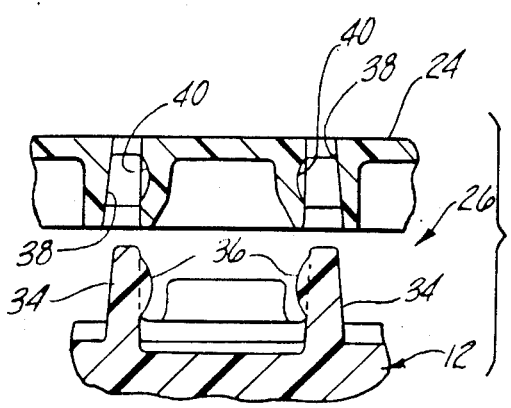
FIG. 4 is a cross-sectional view taken on line 4—4 of FIG. 3 with the lid separated from the cap, showing the details of the hinge structure.

Referring to FIGS. 2 and 4, hinge means 26 is constructed by forming complementary engaging means adjacent the periphery on the cap 12 and the lid 24. Spaced apart rectangular posts 34 are formed integral with cap 12 extending vertically upward from, that is perpendicular to, flat top 16. One edge of each post 34 is in line with the other periphery of the cap skirt 18. A spherically convex or curvilinear projection 36 is formed on each of the wider sides of the post facing each other. The lid 24 is provided with a pair of complementary, spaced apart slots 38 to receive posts 34, and each slot 38 is provided with a complementary spherical or curvilinear indentation 40 facing towards each other to receive the spherical projections 36 on each post. The slots 38 are formed with an opening in the top and bottom of the lid as well as the periphery. Both the cap 12 and lid 24 are assembled together by pushing the posts 34 into slots 38 and forcing the complementary spherical projections 36 into the concave spherical indentations 40 to complete the hinge means 26 which allows the lid to move between an open and closed position by pivotable movement of the spherical projections 36 in the spherical concave indentations 40. As seen in FIG. 2, this construction allows the lid to be pivoted 180 in the opening direction. When the lid 24 is fully closed so that plug 28 fully engages pouring nozzle 22, the cylindrical walls of the lid 24 and cap are in alignment with each other and the hinge means are within the periphery of the cap and lid and the outer edges of the posts 34 are flush with the periphery of lid skirt 30 and the top of the lid.

While the spherical projections 36 and the indentations 40 are shown in the preferred form of FIG. 4 to be facing toward each other, they could be operatively located on posts 34 and in slots 38 facing outwardly away from each other. The projections and indentations could also be located on the same side of the posts and slots, facing right or left as viewed in FIG. 4. The projections and corresponding indentations could also be located on both sides of the posts and slots, although this is not as desirable as a single projection on one side because of a greater stability, and frictional engagement offered by the flat surface on one side of the posts which better holds the lid in a predetermined opened position. It should be noted that the slots and posts can be interchanged so that the posts are formed on the lid and slots are formed in the cap.

While projections 36 and indentations 40 have been characterized as spherical, it should be understood that the term spherical and curvilinear embrace conical, frusto-conical, substantially cylindrical and other curved or rounded surfaces as long as the projection and indentation are complementary to each other, and the rounded or cylindrical complementary surfaces are arranged to permit free swinging about an axis of rotation through both posts. Also, the top of cap 12 is formed with a cylindrical surface, as shown in FIG. 3, which is concentric to this axis of the hinge. If it is desired to maintain or have the lid seek a particular position as it is opened, the rounded or spherical surface can be ovaled. Also, as seen in FIG. 4, the axis of the hinge passing through both projections is above the mid point of the post to prevent interference.

While FIGS. 1-4 show the hinge constructed with hinge posts 34 formed integrally with cap 12 mating with slots 38 formed in lid 24, FIGS. 5 and 6 may be viewed as having the hinge posts 34 formed integrally with lid 24 mating with slots 38 formed in cap 12. As shown best in FIG. 6, posts 34 have base portions 33 attached to and extending perpendicularly from the flat portion of lid 24 and cantilevered portions 35 extending between slots 37. Referring to FIG. 5, slots 38 are formed on cap 12 between pairs of parallel spaced tabs 39 extending perpendicularly from the flat top 16 of cap 12. Cap slot forming tabs 39 are themselves received in slots 37 when the lid is assembled to cap 12 to complete the hinge 26. Curvilinear projections 36 extend inwardly toward each other from posts 34 and complementary curvilinear indentations 40 in slot walls or tabs 39 face toward each other to receive projections 36. Obviously, tabs 39 could alternatively be referred to as posts on cap 12 which mate with slots 37 on lid 24.

In the embodiment shown in FIGS. 7 and 8, the hinge posts 34 are shown extending upwardly from cap 12 engaging slots 38 in lid 24 as in FIGS. 1-4, but the lid skirt 30 is cut away along a horizontal line between the two hinge slots 38 providing a shortened skirt portion 42. Cylindrical side wall 18 is extended upwardly on cap 12 to a mid point between posts 34 as web 44. Skirt portion 42 on the lid 24 and wall and wall portion or web 44 on cap 12 comlete skirt 30 between the posts 34. By splitting this wall between the posts and providing a chamber 46 on the top of web 44, adequate clearance is provided to swing the lid 180 to a fully open position.

Also shown in FIGS. 7 and 8 are upwardly and outwardly flared projections 48 an cap 12 which cooperate with lid 24 to retain the cap snapped in a closed position. Projections 48 may cooperate directly with the inside diameter of lid skirt 30 or with inwardly projecting beads 50. This is particularly useful where the dispensing orifice occupies a major portion of the inside diameter of the cap as shown in FIGS. 7 and 8, although it may be used with a smaller orifice and plug 28.

The two post design offers a hinge of great stability so that the lid does not become disengaged from the cap during normal opening and closing use, but the two parts can be taken apart for thorough cleaning, for example, when the container is refilled. With this unique two post design, there is no protrusion of the hinge nor is there any cavity necessary to accommodate the hinge structure. In fact the hinge is hidden in the closed position presenting an esthetically pleasing symmetrical appearance with much less vulnerability to the hinge during normal handling. The two piece closure offers a virtually indestructable structure in normal use as compared to a one piece cap-lid-hinge structure which has a live hinge which is often creased to facilitate holding in an open position, thereby presenting an area subject to cracking and failure after extended use. The two piece structure offers other advantages over the single piece structures such as the fact that the cap and lid may be made with different colors improving the esthetics of the product package. With a two piece closure it is possible to improve the tooling for higher production rate. For example, the cap might be made in a 32 cavity mold whereas the lid might be made in a 64 cavity mold, making it possible to run both molds at optimum capacity instead of limiting the capacity of a one piece structure mold to the slowest or most difficult portion of the closure design being formed.

The embodiments of the invention in which an exclusive property or privilege is claimed are defined as follows:

1. A two piece dispensing closure for a container comprising, in combination: a cap having a cylindrical side wall and a top with a dispensing orifice therethrough and a pair of spaced apart posts within the periphery of and integral with said cap projecting upwardly from said cap towards a lid, each post being provided with one of an integral curvilinear projection and indentation aligned with the other of an integral curvilinear projection and indentation on the other of said posts; a lid having a depending annular skirt, said cylindrical cap side wall and said depending annular lid skirt being aligned with each other in a position closing said orifice, said lid being provided with a pair of slots having an opening at the top, bottom and periphery of said lid and said slots further being provided with one of an integral curvilinear projection and indentation complementary to the ones of said projections and indentations on said posts, said slots and ones of said projections and indentations being aligned to receive said pair of posts and ones of said projections and indentations providing a hinge action allowing said lid to move between open and closed positions by pivotal movement of said curvilinear projections in said complementary curvilinear indentations; and a web extending upwardly between and to a vertical mid point on said posts and a portion of the depending annular skirt between said slots on said lid being cut away to receive said web to provide clearance for said lid as it is pivoted between said open and closed positions.

2. A two piece dispensing closure for a container comprising, in combination: a cap having a flat top and a depending cylindrical skirt; a dispensing orifice formed in the top of said cap; a pair of spaced apart posts adjacent to the periphery of and integral with said cap projecting upwardly from said cap with one side of each post flush with said cylindrical cap skirt; one of a curvilinear projection and indentation on each post in line with each other; a lid for closing said orifice having a flat top and a depending annular skirt aligned with said cylindrical cap skirt when said lid is in a closed position covering said orifice; a pair of slots formed in the periphery of said lid projecting through the top and annular skirt of said lid and having side walls on each side of both slots projecting downwardly from the top; one of a curvilinear projection and indentation complementary to ones of said post projections and indentations formed in one of said side walls of each slot, said ones of projections and indentations being in line with each other; said pairs of slots and ones of said projections and indentations being aligned and receiving said posts and ones of said projections and indentations providing a pair of hinges allowing said lid to swing between said closed position wherein said one side of each post is also flush with said annular lid skirt, and an open position in which said lid can be located 180° from said closed position by the pivotal movement of said curvilinear projections in said complementary curvilinear indentations.

3. The two piece dispensing closure of claim 2 wherein said cap top is formed with a recessed peripheral rim which accommodates said annular lid skirt when said lid is in the closed position.

4. The two piece dispensing closure of claim 3 wherein said recessed peripheral cap rim and said annular lid skirt are formed to maintain said lid in said closed position on said cap.

5. The two piece dispensing closure of claim 4 wherein an upwardly and outwardly extending projection on said cap engages an inwardly directed bead on said lid to maintain said lid in said closed position.

6. The two piece dispensing closure of claim 2 wherein said cap top is formed with an upstanding rim circumposing said orifice and forming a dispensing nozzle, and said lid is formed with a depending plug engageable with said nozzle to seal said dispensing nozzle when said lid is in said closed position.

7. The two piece dispensing closure of claim 6 wherein said plug and nozzle are formed to maintain said lid in said closed position.

8. The two piece dispensing closure of claim 2 wherein the top of said cap is further formed with a cylindrical recess adjacent said periphery extending between said posts and concentric to a hinge axis centrally through said projections providing clearance for said lid as it is swung between said open and closed positions.

9. A two piece dispensing closure for a container comprising, in combination: a cap having a flat top and a depending cylindrical skirt; a dispensing orifice formed in the top of said cap; a lid for closing said orifice having a flat top and a depending cylindrical skirt aligned with said cylindrical cap skirt when said lid is in a closed position covering said orifice; a pair of spaced apart posts integral with and adjacent to the periphery of one of said cap and lid projecting perpendicular therefrom with one side of each post flush with the cylindrical skirt of said one of said cap and lid; one of a curvilinear projection and indentation on each post in line with one of a curvilinear projection and indentation on the other post; a pair of slots formed in the periphery of the other of said cap and lid and opening at the top and cylindrical skirt thereof and having side walls on each side of both slots; one of a curvilinear projection and indentation complementary to said one of said post projection and indentation formed in one of said side walls of each slot, said ones of said projections and indentations being in line with each other; said pair of slots and ones of said projections and indentations being aligned and receiving said post and ones of said projections and indentations providing a pair of hinges allowing said lid to swing between said closed position wherein said one side of each post is also flush with the cylindrical skirt of the other of said cap and lid, and an open position in which said lid can be rotated 180° from said closed position by the pivotal movement of said curvilinear projections in said complementary curvilinear indentations.

10. The two piece dispensing closure of claim 9 and further comprising a means to maintain said lid in a closed position relative to said cap.

11. The two piece dispensing closure of claim 10 wherein said means to maintain said lid in a closed position includes a closure plug on said lid engageable with said dispensing orifice in said cap.

12. The two piece dispensing closure of claim 9 further comprising a gripping indentation on the cap extending toward the top of said cap to permit gripping of the lid to swing it into its open position.

13. The two piece dispensing closure of claim 12 wherein said hinge is disposed on a diametric line with said dispensing orifice and said gripping indentation.

14. The two piece dispensing closure of claim 9 wherein said posts and said slots are within the periphery of said cap and lid.

15. The two piece dispensing closure of claim 9 wherein opposite sides of each of said slots frictionally engage opposite sides of the respective ones of said posts to maintain said lid in a selected hinged positon between said open and closed positions.

16. The two piece dipsensing closure of claim 9 wherein the top of said cap is formed with a cylindrical recess adjacent its periphery and concentric to an axis through said projections and indentations providing clearance for said lid as it is pivoted between said open and closed positions.

17. The two piece dispensing closure of claim 12 wherein said gripping indentation is beveled toward the top of said cap.

18. The two piece closure of claim 9 wherein said pair of spaced apart posts are integral with said lid and said slots are formed in said cap.

* * * * *

UNITED STATES PATENT AND TRADEMARK OFFICE
CERTIFICATE OF CORRECTION

PATENT NO. : 4,666,068
DATED : May 19, 1987
INVENTOR(S) : Randall G. Bush

It is certified that error appears in the above-identified patent and that said Letters Patent is hereby corrected as shown below:

Column 4, line 53, "chamber" should read --chamfer--.

Column 4, line 17, after "surface" add the numeral --27--.

Signed and Sealed this

Twelfth Day of April, 1988

Attest:

DONALD J. QUIGG

*Attesting Officer*  *Commissioner of Patents and Trademarks*